(12) United States Patent
Nakamura et al.

(10) Patent No.: US 10,411,539 B2
(45) Date of Patent: Sep. 10, 2019

(54) STATOR FOR ROTARY ELECTRIC MACHINE HAVING RESPECTIVE TERMINAL WIRES CONNECTED TO A CONNECTING MEMBER

(71) Applicant: Mitsubishi Electric Corporation, Tokyo (JP)

(72) Inventors: Masashi Nakamura, Tokyo (JP); Kohei Egashira, Tokyo (JP); Tatsuro Hino, Tokyo (JP); Tetsuya Yokogawa, Tokyo (JP); Shinkichi Sawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 660 days.

(21) Appl. No.: 15/092,735

(22) Filed: Apr. 7, 2016

(65) Prior Publication Data
US 2017/0117768 A1    Apr. 27, 2017

(30) Foreign Application Priority Data
Oct. 22, 2015    (JP) .................................. 2015-207869

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 3/12* (2013.01); *H02K 15/024* (2013.01);
(Continued)

(58) Field of Classification Search
CPC ............ H02K 1/16; H02K 1/165; H02K 1/27; H02K 1/276; H02K 1/28; H02K 3/12;
(Continued)

(56) References Cited

U.S. PATENT DOCUMENTS 6,469,413 B1 * 10/2002 Oohashi ................... H02K 3/28
                                                           310/184
2010/0141078 A1 * 6/2010 Kouda ...................... H02K 3/12
                                                           310/195
(Continued)

FOREIGN PATENT DOCUMENTS

| JP | 2011142747 A | 7/2011 | |
|---|---|---|---|
| JP | 2012-143019 A | 7/2012 | |
| JP | WO 2014065026 A1 * | 5/2014 | ............... H02K 3/12 |
| JP | 2015116108 A | 6/2015 | |

OTHER PUBLICATIONS

Tsuiki et al., English Machine Translation of WO 2014/065026 A1.*
Communication dated Jul. 26, 2016, from the Japanese Patent Office in counterpart application No. 2015-207869.

*Primary Examiner* — Julio C. Gonzalez
*Assistant Examiner* — Rashad H Johnson
(74) *Attorney, Agent, or Firm* — Sughrue Mion, PLLC; Richard C. Turner

(57) ABSTRACT

Winding bodies include: a first terminal wire that extends outward at a first axial end of a stator core from a radially innermost position inside slots; and a second terminal wire that extends outward at the first axial end of the stator core from a radially outermost position inside the slots, the first terminal wires are each led radially outward over coil ends of the stator winding, the second terminal wires are each led radially outward at positions that are nearer to the stator core than end portions of the first terminal wires that are led radially outward over the coil ends of the stator winding, and end portions of intraphase connecting second terminal wires are stacked in an axial direction with, placed in contact with, and connected to end portions of intraphase connecting first terminal wires that are subject to connection therewith.

18 Claims, 9 Drawing Sheets

(51) Int. Cl.
*H02K 3/12* (2006.01)
*H02K 15/02* (2006.01)
*H02K 15/085* (2006.01)
H02K 15/04 (2006.01)
H02K 1/27 (2006.01)
H02K 3/50 (2006.01)

(52) U.S. Cl.
CPC ........... *H02K 15/085* (2013.01); *H02K 1/276* (2013.01); *H02K 3/50* (2013.01); *H02K 15/0435* (2013.01)

(58) Field of Classification Search
CPC ............ H02K 3/28; H02K 3/34; H02K 3/345; H02K 15/12
USPC ........................ 310/154.07, 156.21, 198, 215
See application file for complete search history.

(56) References Cited

U.S. PATENT DOCUMENTS

| | | | | |
|---|---|---|---|---|
| 2010/0148621 A1* | 6/2010 | Ishizuka | ................. | H02K 3/12 310/201 |
| 2011/0012450 A1* | 1/2011 | Umeda | ................... | H02K 3/12 310/71 |
| 2012/0019081 A1* | 1/2012 | Tamura | ................... | H02K 3/12 310/43 |
| 2012/0025658 A1* | 2/2012 | Watanabe | ............... | H02K 3/12 310/179 |
| 2015/0171693 A1* | 6/2015 | Sakaue | ................... | H02K 3/38 310/215 |
| 2016/0065035 A1* | 3/2016 | Nakamura | .............. | H02K 9/19 310/59 |

\* cited by examiner

STATOR FOR ROTARY ELECTRIC MACHINE HAVING RESPECTIVE TERMINAL WIRES CONNECTED TO A CONNECTING MEMBER

BACKGROUND OF THE INVENTION

1. Field of the Invention

The present invention relates to a stator for a rotary electric machine such as an electric motor or a generator, for example, and particularly relates to a connecting construction for a stator winding.

2. Description of the Related Art

In a conventional stator for a rotary electric machine according to Patent Literature 1, respective winding bodies that are produced by winding conductor wires onto a stator core are configured such that two terminal wires of the conductor wires protrude in identical axial directions of a stator core from a radially inner side and a radially outer side. The terminal wires of winding bodies that constitute phase windings are each bent approximately perpendicularly, and are extended radially outside the stator core. Then, the end portions of the terminal wires on the radially inner side of the winding bodies that are extended radially outside the stator core are stacked together axially with the end portions of the terminal wires on a radially outer side of the winding bodies that are subject to connection therewith, which are extended radially outside the stator core, and are connected by welding to constitute the phase windings. The two terminal wires of the phase windings are extended axially without being bent perpendicularly, and are connected to busbars for neutral points and for electric power supply, which are plate- or rod-shaped conductors, to constitute a stator winding.

CITATION LIST

Patent Literature

[Patent Literature 1] Japanese Patent Laid-Open No. 2012-143019 (Gazette)

SUMMARY OF THE INVENTION

In Patent Literature 1, because welding together the terminal wires of the winding bodies that constitute phase windings is welding from radially outside, and welding of AC connecting portions that connect the terminal wires of the phase windings and the busbars is welding from axially outside, the welding directions are different. Consequently, one problem has been that it is necessary to perform welding together of the terminal wires of the winding bodies that constitute phase windings and welding of the AC connecting portions in different steps, reducing productivity. Furthermore, if welding together the terminal wires of the winding bodies that constitute phase windings and welding of the AC connecting portions are performed using the same equipment, then complicated steps such as tilting the stator core are required for every welded position, further leading to reductions in productivity.

Furthermore, in Patent Literature 1, a busbar module in which a plurality of busbars are integrated using an insulating resin is disposed axially outside the winding bodies that are wound into the stator core. The two terminal wires of the phase windings pass over the terminal wires of the winding bodies that constitute the phase windings, which are bent approximately perpendicularly and extend radially outward, are extended axially outward, and are connected by welding to the busbars that are subject to connection therewith. Thus, one problem has been that the busbar module protrudes axially outward from the winding bodies that are wound onto the stator core, increasing the axial dimensions of the stator, and leading to increases in the size of the rotary electric machine.

The present invention aims to solve the above problems and an object of the present invention is to provide a stator for a rotary electric machine that increases productivity by orienting welding directions of all connecting portions of a stator winding in a radial direction, and that also suppresses increases in axial dimensions by lowering axial height positions of all of the connecting portions of the stator winding.

In order to achieve the above object, according to one aspect of the present invention, there is provided a stator for a rotary electric machine, the stator including: an annular stator core in which slots are arranged circumferentially; and a stator winding that is mounted to the stator core. The stator winding is configured by mounting distributed winding bodies to the stator core circumferentially at a pitch of one slot so as to be equal in number to a total number of the slots, the distributed winding bodies each being constituted by a jointless continuous conductor wire that is coated with insulation, the winding bodies include: a first terminal wire of the conductor wire that extends outward at a first axial end of the stator core from a radially innermost position inside the slots; and a second terminal wire of the conductor wire that extends outward at the first axial end of the stator core from a radially outermost position inside the slots, the first terminal wires are each led radially outward over coil ends of the stator winding, the second terminal wires are each led radially outward at positions that are nearer to the stator core than end portions of the first terminal wires that are led radially outward over the coil ends of the stator winding, and end portions of intraphase connecting second terminal wires that constitute intraphase connecting portions among the second terminal wires are stacked in an axial direction with, placed in contact with, and connected to end portions of intraphase connecting first terminal wires that constitute intraphase connecting portions that are subject to connection therewith among the first terminal wires.

The first terminal wires are each led radially outward over the coil ends of the stator winding, and the second terminal wires are each led radially outward at positions that are nearer to the stator core than the end portions of the first terminal wires that are led radially outward over the coil ends of the stator winding. Thus, the connecting portions between the first terminal wires and the second terminal wires in the stator winding do not pass over the end portions of the first terminal wires which are led radially outward, and do not protrude axially outward, enabling increases in axial dimensions of the stator to be suppressed.

The end portions of the intraphase connecting second terminal wires are stacked in an axial direction with, placed in contact with, and connected to the end portions of the intraphase connecting first terminal wires that are subject to connection therewith. Thus, it becomes possible to connect the end portions of the intraphase connecting first terminal wires and the intraphase connecting second terminal wires together by welding from a radial direction.

The end portions of the second terminal wires other than the intraphase connecting second terminal wires and the end portions of the first terminal wires that are subject to connection therewith are led radially outward. Thus, it becomes possible to connect the end portions of the first terminal wires and the second terminal wires together by welding from a radial direction. Even if the end portions of the first terminal wires and the second terminal wires are connected together using members that are separate from the conductor wires, it becomes possible to connect the connecting portions therebetween by welding from a radial direction.

Consequently, the welding directions of the connecting portions of the stator winding can all be oriented in a radial direction, increasing productivity.

DETAILED DESCRIPTION OF THE PREFERRED EMBODIMENTS

Preferred embodiments of a stator for a rotary electric machine according to the present invention will now be explained with reference to the drawings.

Embodiment 1

Figure 1:
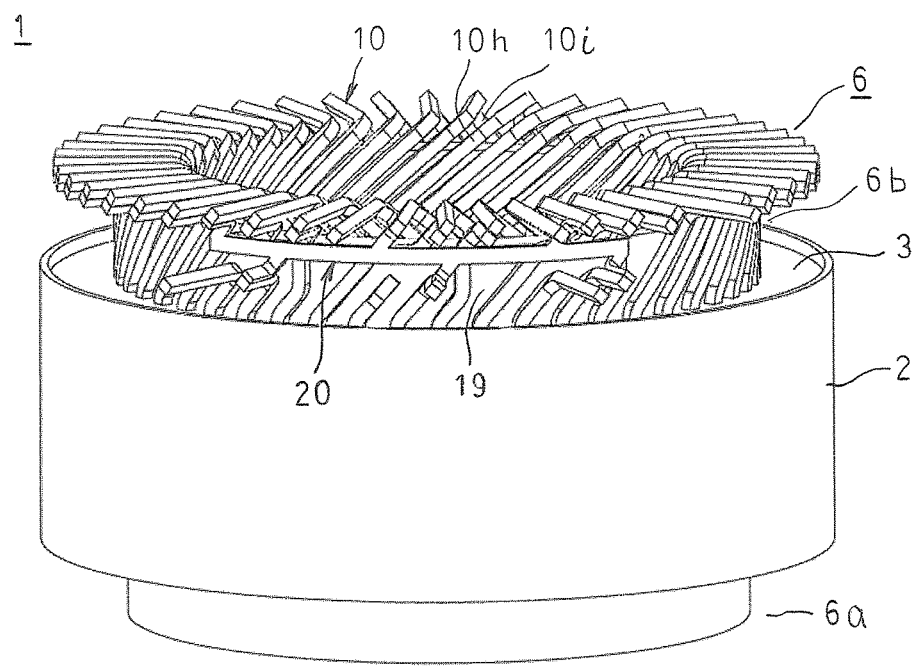
FIG. 1 is an oblique projection that shows a stator for a rotary electric machine according to Embodiment 1 of the present invention.
Figure 2:
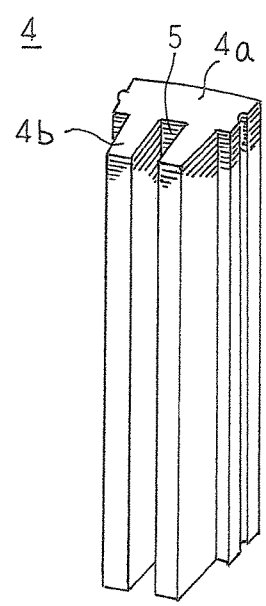
FIG. 2 is an oblique projection that shows a core block that constitutes part of a stator core in the stator for a rotary electric machine according to Embodiment 1.
Figure 3:
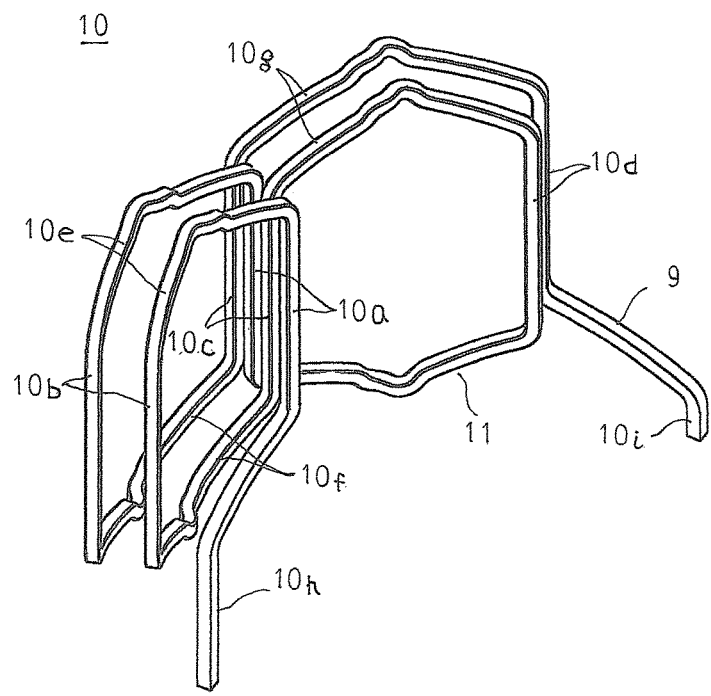
FIG. 3 is an oblique projection that shows a winding body that constitutes part of a stator winding in the stator for a rotary electric machine according to Embodiment 1.
Figure 4:
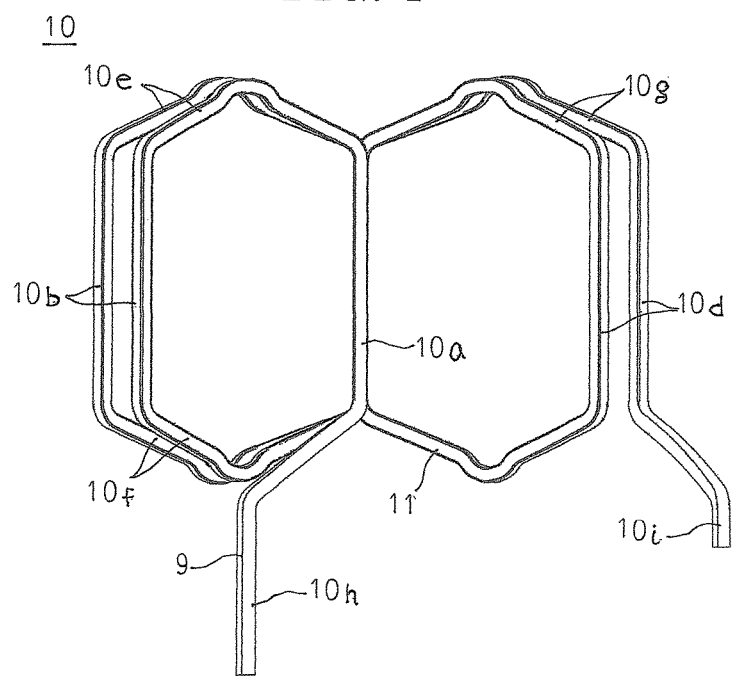
FIG. 4 is a front elevation that shows the winding body that constitutes part of the stator winding in the stator for a rotary electric machine according to Embodiment 1.
Figure 5:
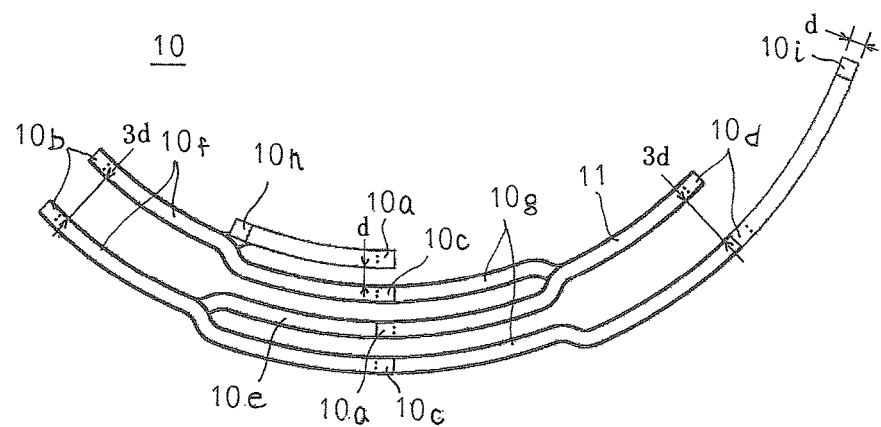
FIG. 5 is an end elevation viewed from a side near second coil ends that shows the winding body that constitutes part of the stator winding in the stator for a rotary electric machine according to Embodiment 1.
Figure 6:
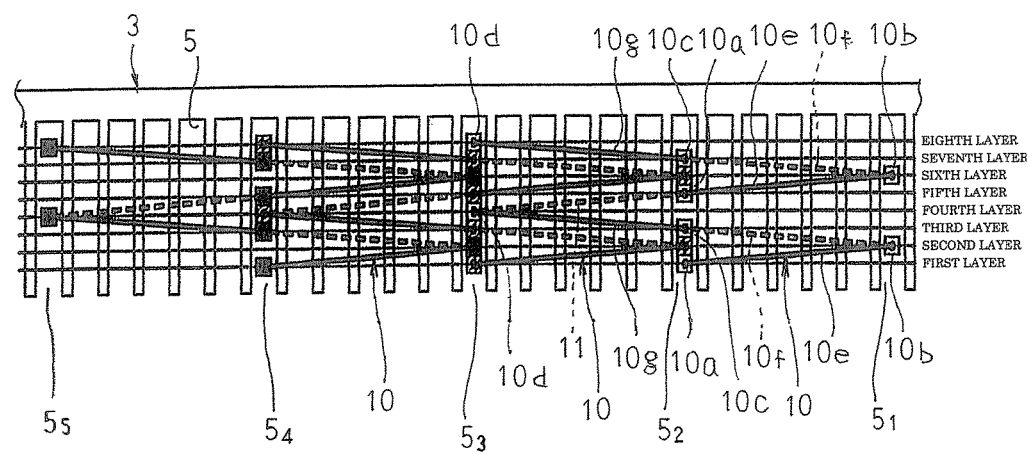
FIG. 6 is a partial end elevation viewed from a side near second coil ends that shows a state in which three winding bodies that constitute part of the stator winding in the stator for a rotary electric machine according to Embodiment 1 are mounted into the stator core so as to share a single slot.
Figure 7:
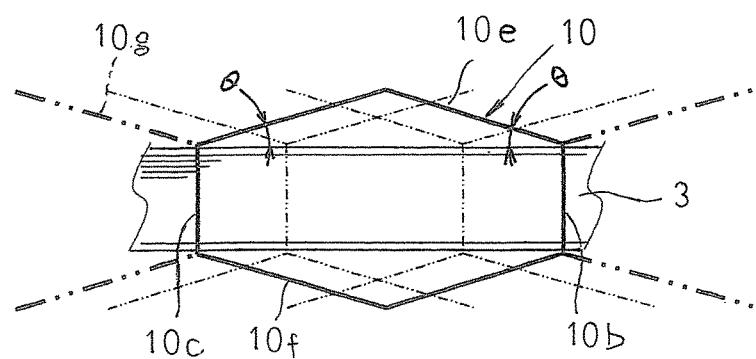
FIG. 7 is a developed projection viewed from radially outside that shows a winding body that is mounted onto the stator core in the stator for a rotary electric machine according to Embodiment 1.
Figure 8:
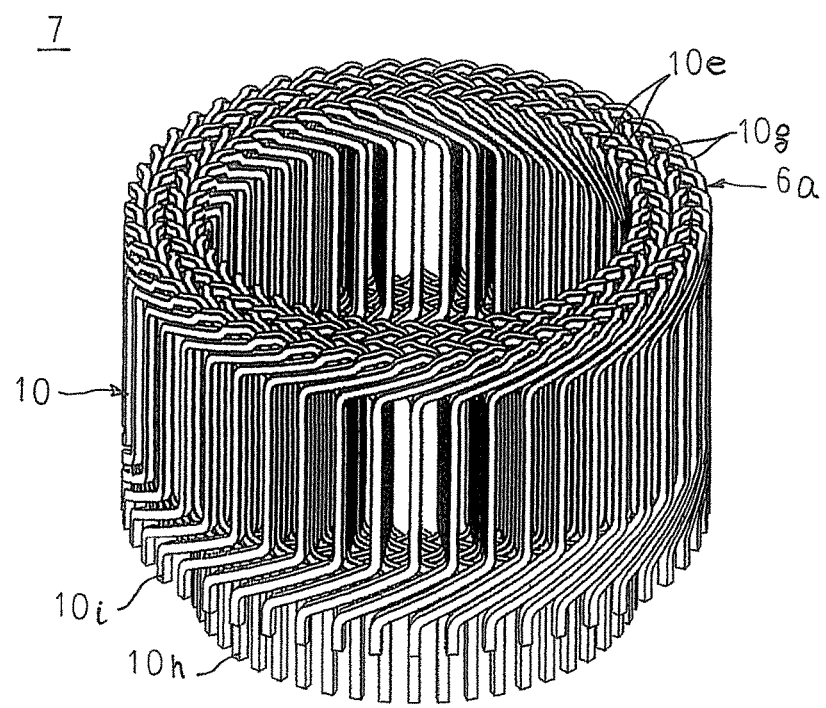
FIG. 8 is an oblique projection that shows a winding assembly that constitutes part of a stator winding in the stator for a rotary electric machine according to Embodiment 1.
Figure 9:
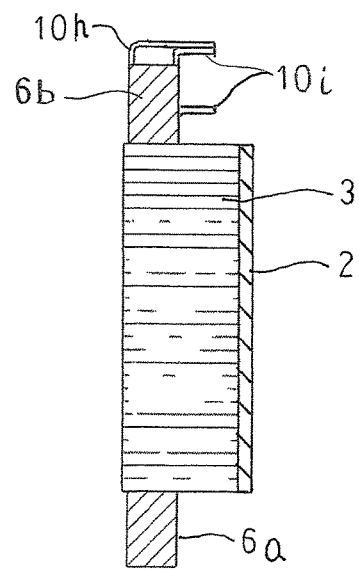
FIG. 9 is a partial cross section that explains joining of the winding bodies in the stator for a rotary electric machine according to Embodiment 1.
Figure 10:
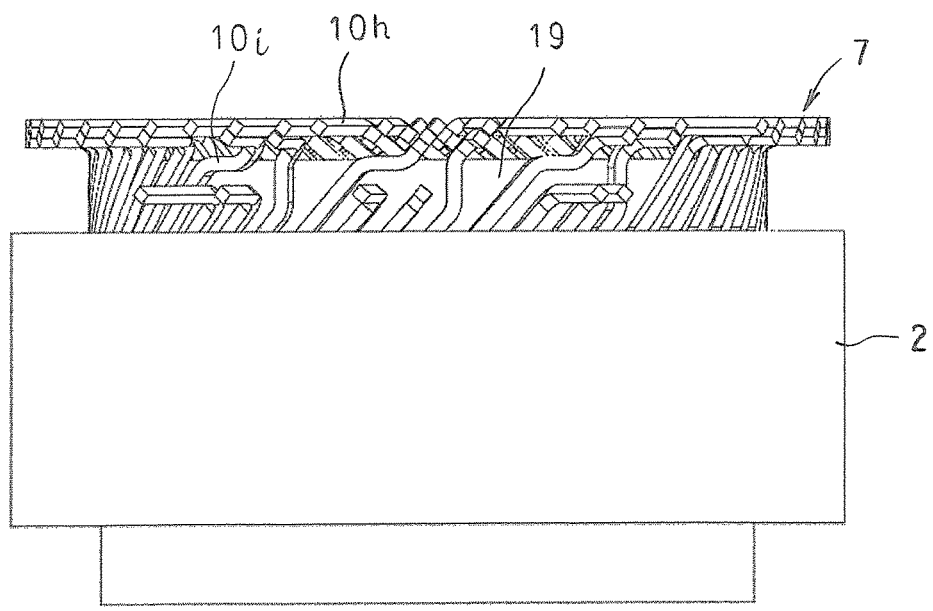
FIG. 10 is a side elevation that shows a state in which the winding assembly that constitutes part of the stator winding is mounted to the stator core in the stator for a rotary electric machine according to Embodiment 1.
Figure 11:
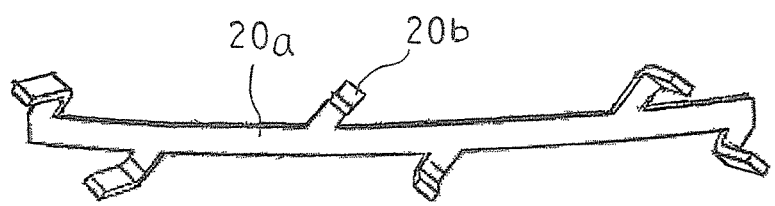
FIG. 11 is an oblique projection that shows a connecting member in the stator for a rotary electric machine according to Embodiment 1.
Figure 12:
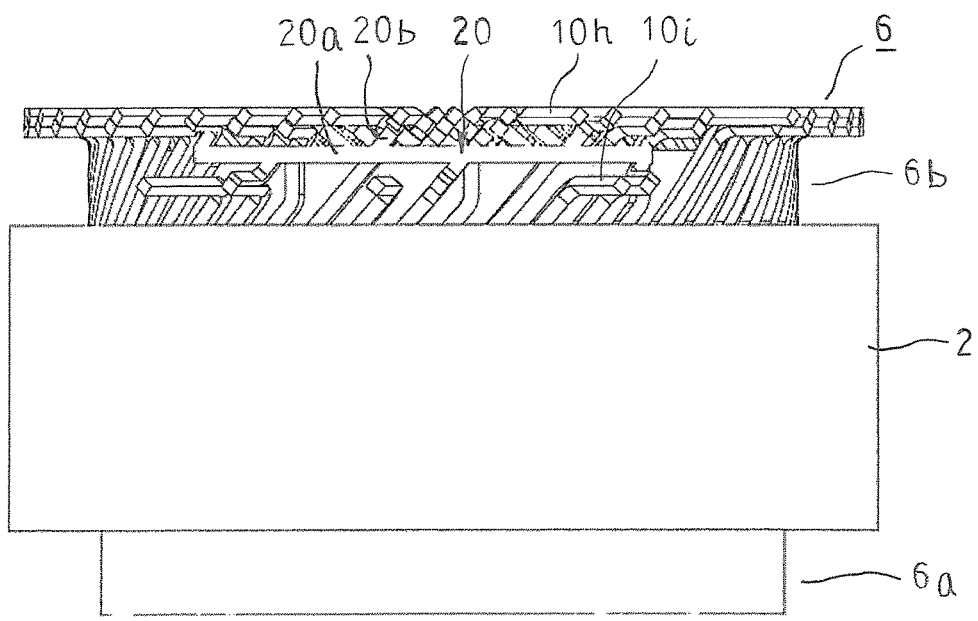
FIG. 12 is a side elevation that shows the stator for a rotary electric machine according to Embodiment 1 of the present invention.
Figure 13:
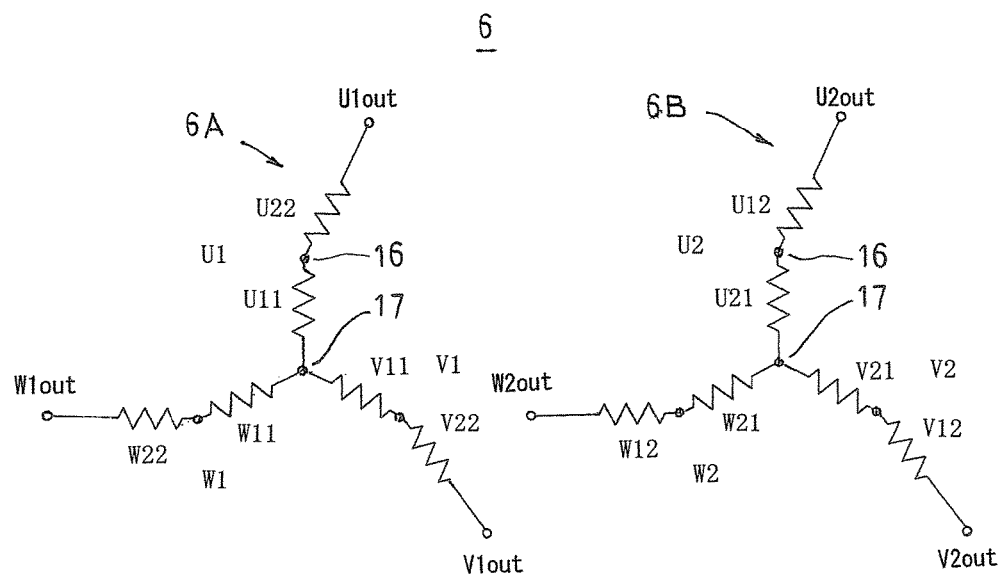
FIG. 13 shows connection diagrams for the stator winding in the stator for a rotary electric machine according to Embodiment 1.

FIG. 1 is an oblique projection that shows a stator for a rotary electric machine according to Embodiment 1 of the present invention, FIG. 2 is an oblique projection that shows a core block that constitutes part of a stator core in the stator for a rotary electric machine according to Embodiment 1, FIG. 3 is an oblique projection that shows a winding body that constitutes part of a stator winding in the stator for a rotary electric machine according to Embodiment 1, FIG. 4 is a front elevation that shows the winding body that constitutes part of the stator winding in the stator for a rotary electric machine according to Embodiment 1, FIG. 5 is an end elevation viewed from a side near second coil ends that shows the winding body that constitutes part of the stator winding in the stator for a rotary electric machine according to Embodiment 1, FIG. 6 is a partial end elevation viewed from a side near second coil ends that shows a state in which three winding bodies that constitute part of the stator winding in the stator for a rotary electric machine according to Embodiment 1 are mounted into the stator core so as to share a single slot, FIG. 7 is a developed projection viewed from radially outside that shows a winding body that is mounted onto the stator core in the stator for a rotary electric machine according to Embodiment 1, FIG. 8 is an oblique projection that shows a winding assembly that constitutes part of a stator winding in the stator for a rotary electric machine according to Embodiment 1, FIG. 9 is a partial cross section that explains joining of the winding bodies in the stator for a rotary electric machine according to Embodiment 1, FIG. 10 is a side elevation that shows a state in which the winding assembly that constitutes part of the stator winding is mounted to the stator core in the stator for a rotary electric machine according to Embodiment 1, FIG. 11 is an oblique projection that shows a connecting member in the stator for a rotary electric machine according to Embodiment 1, FIG. 12 is a side elevation that shows the stator for a rotary electric machine according to Embodiment 1 of the present invention, and FIG. 13 shows connection diagrams for the stator winding in the stator for a rotary electric machine according to Embodiment 1.

In FIG. 1, a stator 1 is a stator for a rotary electric machine such as an electric motor or a generator, etc., and includes: an annular stator core 3; a stator winding 6 that is mounted to the stator core 3; and connecting members 20 that connect the stator winding 6. Here, to facilitate explanation, the number of slots in the stator core 3 is forty-eight, and the stator winding 6 is a three-phase alternating-current winding. Furthermore, slots 5 are formed on the stator core 3 at a ratio of two slots per phase per pole.

As shown in FIG. 2, core blocks 4 are configured by dividing the annular stator core 3 into twenty-four equal sections circumferentially, are produced by laminating and integrating silicon steel sheets, and include: a core back portion 4*a* that has a circular arc-shaped cross section; and two teeth 4b that each project radially inward from an inner circumferential wall surface of the core back portion 12a so as to be separated in a circumferential direction. The stator core 3 is produced by arranging twenty-four core blocks 4 into an annular shape circumferentially by butting together circumferential side surfaces of the core back portion 4a such that the teeth 4b are oriented radially inward, and integrating them by shrink-fitting them, or press-fitting them, etc., into a cylindrical frame 2. The slots 5, which are formed by the core back portions 4a and the teeth 4b, are arranged at a uniform angular pitch circumferentially so as to be open on an inner circumferential side.

The stator winding 6 includes forty-eight winding bodies 10 that are disposed at a pitch of one slot circumferentially around the stator core 3.

The winding bodies 10 are distributed windings that are produced by winding into edgewise windings conductor wires 9 that are made of jointless continuous rectangular copper wire that is insulated using an enamel resin, for example. Specifically, as shown in FIGS. 3 through 5, the winding bodies 10 are configured such that two δ-shaped coil patterns that are constituted by a first rectilinear portion 10a, a first coil end portion 10e, a second rectilinear portion 10b, a second coil end portion 10f, a third rectilinear portion 10c, a third coil end portion 10g, and a fourth rectilinear portion 10d are arranged in a longitudinal direction of short sides of oblong cross sections of the conductor wires 9, and the fourth rectilinear portion 10d and the first rectilinear portion 10a are linked using a linking wire 11. The linking wires 11 constitute coil end portions, winding start end portions of the conductor wires 9 constitute first terminal wires 10h, and winding finish end portions constitute second terminal wires 10i.

In winding bodies 10 that are configured in this manner, four first rectilinear portions 10a and third rectilinear portions 10c are arranged in a single column such that longitudinal directions of long sides of the oblong cross sections are oriented in a circumferential direction so as to leave gaps d in the longitudinal direction of the short sides of the oblong cross sections. Two second rectilinear portions 10b are arranged so as to be separated by an angular pitch of six slots in a first circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Two fourth rectilinear portions 10d are arranged so as to be separated by an angular pitch of six slots in a second circumferential direction from the column of first rectilinear portions 10a and third rectilinear portions 10c such that longitudinal directions of long sides of the oblong cross sections are oriented in a circumferential direction so as to leave a gap 3d in the longitudinal direction of the short sides of the oblong cross sections. Moreover, an angular pitch of six slots is a pitch between slot centers of slots 5 on two sides of six consecutive teeth 4b, and corresponds to a pitch of one magnetic pole. Furthermore, d is a length of the short sides of the oblong cross sections of the conductor wires 9.

FIG. 6 shows a state in which three winding bodies 10 are each mounted into the stator core 3 so as to share one slot 5. FIG. 7 shows the state in which the winding bodies 10 are mounted into the stator core when viewed from radially outside. In FIG. 9, five slots 5 that line up at an angular pitch of six slots circumferentially will be designated a first slot 51, a second slot 52, a third slot 53, a fourth slot 54, and a fifth slot 55, in order circumferentially.

In FIGS. 6 and 7, focusing on one winding body 10, a first coil end portion 10e that extends outward at a second axial end from a first rectilinear portion 10a in a first layer from a slot opening side of the second slot 52 (a radially innermost position) extends toward the first slot 51 circumferentially at an angle of inclination θ, changes lanes (hereinafter "is shifted") radially outward at a vertex portion by a distance d, subsequently extends toward the first slot 51 circumferentially at a reverse angle of inclination θ, and is linked to a second rectilinear portion 10b in a second layer from the slot opening side of the first slot 51. Next, a second coil end portion 10f that extends outward at a first axial end from the second rectilinear portion 10b in the second layer from the slot opening side of the first slot 51 extends toward the second slot 52 circumferentially at an angle of inclination θ, is shifted radially outward at a vertex portion by a distance d, subsequently extends toward the second slot 52 circumferentially at a reverse angle of inclination θ, and is linked to a third rectilinear portion 10c in a third layer from the slot opening side of the second slot 52.

Next, a third coil end portion 10g that extends outward at the second axial end from the third rectilinear portion 10c in the third layer from the slot opening side of the second slot 52 extends toward the third slot 53 circumferentially at an angle of inclination θ, is shifted radially outward at a vertex portion by a distance d, subsequently extends toward the third slot 53 circumferentially at a reverse angle of inclination θ, and is linked to a fourth rectilinear portion 10d in a fourth layer from the slot opening side of the third slot 53.

Next, a linking portion 11 that extends outward at the first axial end from the fourth rectilinear portion 10d in the fourth layer from the slot opening side of the third slot 53 extends toward the second slot 52 circumferentially at an angle of inclination θ, is shifted radially outward at a vertex portion by a distance d, subsequently extends toward the second slot 52 circumferentially at a reverse angle of inclination θ, and is linked to a first rectilinear portion 10a in a fifth layer from the slot opening side of the second slot 52. A first coil end portion 10e that extends outward at the second axial end from the first rectilinear portion 10a in the fifth layer from the slot opening side of the second slot 52 extends toward the first slot 51 circumferentially at an angle of inclination θ, is shifted radially outward at a vertex portion by a distance d, subsequently extends toward the first slot 51 circumferentially at a reverse angle of inclination θ, and is linked to a second rectilinear portion 10b in a sixth layer from the slot opening side of the first slot 51.

Next, the second coil end portion 10f that extends outward at the first axial end from the second rectilinear portion 10b in the sixth layer from the slot opening side of the first slot 51 extends toward the second slot 52 circumferentially at an angle of inclination θ, is shifted radially outward at a vertex portion by a distance d, subsequently extends toward the second slot 52 circumferentially at a reverse angle of inclination θ, and is linked to a third rectilinear portion 10c in a seventh layer from the slot opening side of the second slot 52. Next, a third coil end portion 10g that extends outward at the second axial end from the third rectilinear portion 10c in the seventh layer from the slot opening side of the second slot 52 extends toward the third slot 53 circumferentially at an angle of inclination θ, is shifted radially outward at a vertex portion by a distance d, subsequently extends toward the third slot 53 circumferentially at a reverse angle of inclination θ, and is linked to a fourth rectilinear portion 10d in an eighth layer (a radially outermost position) from the slot opening side of the third slot 53.

Thus, the first rectilinear portion 10*a* in the first layer of the second slot 52 and the second rectilinear portion 10*b* in the second layer of the first slot 51 are linked by the first coil end portion 10*e*, the second rectilinear portion 10*b* in the second layer of the first slot 51 and the third rectilinear portion 10*c* in the third layer of the second slot 52 are linked by the second coil end portion 10*f*, and the third rectilinear portion 10*c* in the third layer of the second slot 52 and the fourth rectilinear portion 10*d* in the fourth layer of the third slot 53 are linked by the third coil end portion 10*g*, to constitute a δ-shaped coil pattern.

In addition, the first rectilinear portion 10*a* in the fifth layer of the second slot 52 and the second rectilinear portion 10*b* in the sixth layer of the first slot 51 are linked by the first coil end portion 10*e*, the second rectilinear portion 10*b* in the sixth layer of the first slot 51 and the third rectilinear portion 10*c* in the seventh layer of the first slot 51 are linked by the second coil end portion 10*f*, and the third rectilinear portion 10*c* in the seventh layer of the second slot 52 and the fourth rectilinear portion 10*d* in the eighth layer of the third slot 53 are linked by the third coil end portion 10*g*, to constitute a δ-shaped coil pattern.

Thus, a winding body 10 is configured by winding a conductor wire 9 into a first slot 51, a second slot 52, and a third slot 53 that line up at an angular pitch of six slots circumferentially, so as to repeat for two iterations in a radial direction a δ-shaped coil pattern that is formed by inserting the conductor wire 9 sequentially in order of the second slot 52, the first slot 51, the second slot 52, and the third slot 53 so as to alternate an axial direction of insertion into the first slot 51, the second slot 52, and the third slot 53.

The winding body 10 is configured by linking the two δ-shaped coil patterns using a linking wire 11 so as to be arranged into two layers in a radial direction. In other words, the winding body 10 is produced by winding the conductor wire 9 in such a way that the two δ-shaped coil patterns become continuous.

A single winding body 10 is similarly mounted into a second slot 52, a third slot 53, and a fourth slot 54 that line up at an angular pitch of six slots circumferentially. This winding body 10 is configured such that a conductor wire 9 is wound so as to repeat for two iterations in a radial direction a δ-shaped coil pattern that is formed by inserting the conductor wire 9 sequentially in order of the third slot 53, the second slot 52, the third slot 53, and the fourth slot 54 so as to alternate an axial direction of insertion into the second slot 52, the third slot 53, and the fourth slot 54.

A single winding body 10 is similarly mounted into a third slot 53, a fourth slot 54, and a fifth slot 55 that line up at an angular pitch of six slots circumferentially. This winding body 10 is configured such that a conductor wire 9 is wound so as to repeat for two iterations in a radial direction a δ-shaped coil pattern that is formed by inserting the conductor wire 9 sequentially in order of the fourth slot 54, the third slot 53, the fourth slot 54, and the fifth slot 55 so as to alternate an axial direction of insertion into the third slot 53, the fourth slot 54, and the fifth slot 55.

Thus, the three winding bodies 10 are mounted to the stator core 3 so as to share the third slot 53. Eight first through fourth rectilinear portions 10*a*, 10*b*, 10*c*, and 10*d* are housed inside the third slot 53 such that the longitudinal directions of the long sides of the oblong cross sections of the conductor wires 9 are oriented circumferentially so as to line up in single columns in a radial direction.

Forty-eight winding bodies 10 that are configured in this manner are arranged concentrically at a pitch of one slot to produce the winding assembly 7 that is shown in FIG. 8. At a second axial end of the winding assembly 7, a layer of first coil end portions 10*e* in which the first coil end portions 10*e* are arranged circumferentially at a pitch of one slot and a layer of third coil end portions 10*g* in which the third coil end portions 10*g* are arranged circumferentially at a pitch of one slot are arranged alternately in four layers in a radial direction to constitute first coil ends 6*a*. At a first axial end of the winding assembly 7, a layer of second coil end portions 10*f* in which the second coil end portions 10*f* are arranged circumferentially at a pitch of one slot and a layer of linking wires 11 in which the linking wires 11 are arranged circumferentially at a pitch of one slot are arranged alternately in three layers in a radial direction to constitute second coil ends 6*b*. Moreover, insulating papers 19 are disposed inside the first and second coil ends 6*a* and 6*b* to ensure electrical insulation between the winding bodies 10.

End portions of the first terminal wires 10*h* each extend axially outward from a radially inner side of the second coil ends 6*b*, and are arranged circumferentially at a pitch of one slot, and end portions of the second terminal wires 10*i* each extend outward in an axial direction that is identical to that of the first terminal wires 10*h* from a radially outer side of the second coil ends 6*b*, and are arranged circumferentially at a pitch of one slot.

Shapes of the first and second terminal wires 10*h* and 10*i* of the winding bodies 10 will now be explained using FIGS. 3 through 6. The first terminal wires 10*h* that extend outward near the second coil ends 6*b* from the first rectilinear portions 10*a* in the first layer of the second slots 52 are formed so as to extend toward the first slots 51 circumferentially at an angle of inclination θ and be bent at vertex portions (intermediate positions between the first slots 51 and the second slots 52) to extend axially outward. The second terminal wires 10*i* that extend outward near the second coil ends 6*b* from the fourth rectilinear portions 10*d* in the eighth layer of the third slots 53 are formed so as to extend toward the fourth slots 54 circumferentially at an angle of inclination θ and be bent at vertex portions (intermediate positions between the third slots 53 and the fourth slots 54) to extend axially outward.

Thus, the circumferential positions of the end portions of the second terminal wires 10*i* that protrude axially outward from the winding bodies 10 in which the first rectilinear portions 10*a* are housed in the second slots 52 align approximately with the circumferential positions of the end portions of the first terminal wires 10*h* that protrude axially outward from the winding bodies 10 in which the first rectilinear portions 10*a* are housed in the fourth slots 54. In other words, the circumferential positions of the end portions that protrude axially outward from the second terminal wires 10*i* of first winding bodies 10 align approximately with the circumferential positions of the end portions that protrude axially outward from the first terminal wires 10*h* of second winding bodies 10 that are two pole pitches away.

Next, a connection method for the winding assembly 7 will be explained by allotting, for convenience, Slot Numbers 1, 2, etc., through 48 in circumferential order to the forty-eight slots 5 that are disposed circumferentially around the stator core 3.

Eight winding bodies 10 are first mounted into a slot group at Slot Numbers (1+6n), where n is a natural number that is greater than or equal to 0 and less than or equal to 7. Then, four winding bodies 10 that are arranged at a pitch of two magnetic poles among the eight winding bodies 10 are respectively connected in series to form small coil groups U11 and U12.

Next, eight winding bodies 10 are mounted into a slot group at Slot Numbers (2+6n). Then, four winding bodies 10 that are arranged at a pitch of two magnetic poles among the eight winding bodies 10 are respectively connected in series to form small coil groups U21 and U22.

Eight winding bodies 10 are mounted into a slot group at Slot Numbers (3+6n). Then, four winding bodies 10 that are arranged at a pitch of two magnetic poles among the eight winding bodies 10 are respectively connected in series to form small coil groups V11 and V12.

Next, eight winding bodies 10 are mounted into a slot group at Slot Numbers (4+6n). Then, four winding bodies 10 that are arranged at a pitch of two magnetic poles among the eight winding bodies 10 are respectively connected in series to form small coil groups V21 and V22.

Eight winding bodies 10 are mounted into a slot group at Slot Numbers (5+6n). Then, four winding bodies 10 that are arranged at a pitch of two magnetic poles among the eight winding bodies 10 are respectively connected in series to form small coil groups W11 and W12.

Next, eight winding bodies 10 are mounted into a slot group at Slot Numbers (6+6n). Then, four winding bodies 10 that are arranged at a pitch of two magnetic poles among the eight winding bodies 10 are respectively connected in series to form small coil groups W21 and W22.

Next, connection between the first terminal wires 10h and the second terminal wires 10i will be explained.

The first terminal wires 10h first exit the slots 5 and extend at an angle of inclination θ in a first circumferential direction, are then bent to extend axially outward, and are bent when they pass the top portions of the second coil end 6b to extend radially outward so as to pass over the second coil ends 6b. All of the first terminal wires 10h are formed by bending so as to have identical shapes, and the portions thereof that extend radially outward so as to pass over the second coil ends 6b are positioned in a common plane that is perpendicular to the axial direction of the winding assembly 7.

The second terminal wires 10i, on the other hand, exit the slots 5 and extend at an angle of inclination θ in a second circumferential direction, are then bent to extend axially outward, and are bent when they reach the top portions of the second coil end 6b to extend radially outward. The second terminal wires 10i for connecting in series the winding bodies 10 that constitute the small coil groups U11, U12, U21, U22, V11, V12, V21, V22, W11, W12, W21, and W22 are all formed by bending so as to have identical shapes, and end portions thereof that extend radially outward contact surfaces of the end portions of the first terminal wires 10h that are subject to connection therewith that extend radially outward on a side that faces the stator core 3, and are stacked approximately axially with the end portions of the first terminal wires 10h.

Then, the end portions of the first and second terminal wires 10h and 10i that are stacked approximately axially are connected by TIG-welding from radially outside. The small coil groups U11, U12, U21, U22, V11, V12, V21, V22, W11, W12, W21, and W22 that are respectively formed by connecting four winding bodies 10 in series are produced thereby.

Moreover, connecting portions that connect together the first and second terminal wires 10h and 10i for configuring the small coil groups U11, U12, U21, U22, V11, V12, V21, V22, W11, W12, W21, and W22 are connecting portions between same-phase winding bodies 10 that are housed in identical slot groups, and are intraphase connecting portions. The end portions of the first and second terminal wires 10h and 10i that constitute intraphase connecting portions are end portions of the intraphase connecting first terminal wires and end portions of the intraphase connecting second terminal wires, respectively.

As shown in FIG. 10, the second terminal wire 10i for connecting the small coil groups U11 and U22 in series, the second terminal wire 10i for connecting the small coil groups U21 and U12 in series, the second terminal wire 10i for connecting the small coil groups V11 and V22 in series, the second terminal wire 10i for connecting the small coil groups V21 and V12 in series, the second terminal wire 10i for connecting the small coil groups W11 and W22 in series, and the second terminal wire 10i for connecting the small coil groups W21 and W12 in series are each formed by bending into a crank shape so as to be offset by a pitch of one slot, and end portions thereof that extend radially outward contact surfaces of the end portions of the first terminal wires 10h that are subject to connection therewith that extend radially outward on a side that faces the stator core 3, and are stacked approximately axially with the end portions of the first terminal wires 10h.

Then, the end portions of the first and second terminal wires 10h and 10i that are stacked approximately axially are connected by TIG-welding from radially outside. A U1-phase winding that is formed by connecting in series the small coil groups U11 and U22, which are offset by 30 electrical degrees, is produced thereby. A V1-phase winding that is formed by connecting in series the small coil groups V11 and V22, which are offset by 30 electrical degrees, is also produced. A W1-phase winding that is formed by connecting in series the small coil groups W11 and W22, which are offset by 30 electrical degrees, is also produced. In addition, a U2-phase winding that is formed by connecting in series the small coil groups U21 and U12, which are offset by 30 electrical degrees, is produced. A V2-phase winding that is formed by connecting in series the small coil groups V21 and V12, which are offset by 30 electrical degrees, is also produced. A W2-phase winding that is formed by connecting in series the small coil groups W21 and W12, which are offset by 30 electrical degrees, is also produced.

Moreover, connecting portions that connect together the first and second terminal wires 10h and 10i for configuring the U1-phase, V1-phase, W1-phase, U2-phase, V2-phase, and W2-phase windings are connecting portions between same-phase winding bodies 10 that are housed in different slot groups, and are same-phase connecting portions 16. The end portions of the first and second terminal wires 10h and 10i that constitute same-phase connecting portions 16 are end portions of the same-phase connecting first terminal wires and end portions of the same-phase connecting second terminal wires, respectively.

Second terminal wires 10i that constitute first ends of the U1-phase, V1-phase, W1-phase, U2-phase, V2-phase, and W2-phase windings, as shown in FIG. 10, are bent and extend outward radially outward at positions that are closer to the stator core 3 than the other second terminal wires 10i. The portions of the second terminal wires 10i in question that extend radially outward are thereby spaced apart axially from the portions of the first terminal wires 10h that extend radially outward.

Moreover, first and second terminal wires 10h and 10i that constitute two ends of the U1-phase winding, the V1-phase winding, the W1-phase winding, the U2-phase winding, the V2-phase winding, and the W2-phase winding are neutral-point connecting terminals and electric power supplying terminals, and together with the first and second terminal wires 10h and 10i that constitute the same-phase connecting portions 16, are disposed so as to be concentrated within a range of approximately a pitch of two magnetic poles in a circumferential direction. Connecting portions among the neutral-point connecting terminals constitute an alternating-current connecting portion 17. The end portions of the first and second terminal wires 10h and 10i that constitute the alternating-current connecting portions 17 are end portions of alternating-current connecting first terminal wires and end portions of alternating-current connecting second terminal wires, respectively. The end portions of the first and second terminal wires 10h and 10i that constitute the electric power supplying terminals are end portions of electric power supplying terminal first terminal wires and end portions of electric power supplying terminal second terminal wires, respectively.

The connecting member 20 is produced by pressing and shaping a copper sheet, for example, and as shown in FIG. 11, includes: a strip-shaped base 20a; and terminals 20b that each extend from the base 20a in a width direction and are then bent perpendicularly, three terminals 20b being disposed on each of two sides in the width direction of the base 20a so as to be separated in a longitudinal direction of the base 20a. Here, the terminals 20b are disposed on the base 20a so as to face the end portions of the first and second terminal wires 10h and 10i that constitute two ends of the U1-phase winding, the V1-phase winding, the W1-phase winding, the U2-phase winding, the V2-phase winding, and the W2-phase winding, i.e., the alternating-current connecting first terminal wires and the alternating-current connecting second terminal wires, which extend radially outward.

The connecting member 20 is disposed between the end portions of the alternating-current connecting first terminal wires and the alternating-current connecting second terminal wires that are separated axially and extend radially outward such that the base 20a is bent into a circular arc shape, and the terminals 20b extend radially outward. The connecting member 20 is positioned such that the end portions of the terminals 20b that extend radially outward are stacked approximately axially in contact with the end portions of the alternating-current connecting first terminal wires and the alternating-current connecting second terminal wires that extend radially outward. Then, the end portions of the alternating-current connecting first terminal wires and the end portions of the terminals 20b that are stacked approximately axially, and the end portions of the alternating-current connecting second terminal wires and the end portions of the terminals 20b that are stacked approximately axially are connected by TIG-welding from radially outside.

As shown in FIG. 13, a first three-phase alternating-current winding 6A in which the U1-phase winding, the V1-phase winding, and the W1-phase winding are wye-connected and a second three-phase alternating-current winding 6B in which the U2-phase winding, the V2-phase winding, and the W2-phase winding are wye-connected are produced thereby.

Thus, the stator winding 6 is constituted by a first three-phase alternating-current winding 6A and a second three-phase alternating-current winding 6B. Six electric power supplying terminals U1 out, V1 out, W1 out, U2 out, V2 out, and W2 out are connected to an external electric power supply by means of inverter circuits, and the rotary electric machine operates as an electric motor.

According to Embodiment 1, the stator winding 6 is configured by mounting distributed winding bodies 10 to a stator core 3 circumferentially at a pitch of one slot so as to be equal in number to a total number of slots 5, the distributed winding bodies 10 each being produced by winding jointless continuous conductor wire 9 that is coated with insulation. The winding bodies 10 are configured such that the first terminal wires 10h, which are winding start end portions of the conductor wires 9, extend outward at a first axial end of the stator core 3 from radially innermost positions inside the slots 5, and the second terminal wires 10i, which are winding finish end portions of the conductor wires 9, extend outward at the first axial end of the stator core 3 from radially outermost positions inside the slots 5. The first terminal wires 10h are each led radially outward so as to pass over the second coil ends 6b. The second terminal wires 10i are each led radially outward at positions that are nearer to the stator core 3 than the end portions of the first terminal wires 10h that are led radially outward over the second coil ends 6b of the stator winding 6. The end portions of the intraphase connecting second terminal wires among the second terminal wires 10i are stacked in an axial direction with, placed in contact with, and connected to the end portions of the intraphase connecting first terminal wires that are subject to connection therewith among the first terminal wires 10h.

Because the end portions of the first and second terminal wires 10h and 10i of the winding bodies 10 are led radially outward, the welding directions of the same-phase connecting portions 16 and the alternating-current connecting portions 17 can be oriented in a radial direction.

Consequently, because it becomes possible for each of the connecting portions in the stator winding 6 to be welded from a radial direction, productivity is improved. The respective connecting portions in the stator winding 6 do not pass over the end portions of the first terminal wires 10h which are led radially outward, and do not protrude axially outward, enabling increases in axial dimensions of the stator 1 to be suppressed. Mountability of the stator 1 is improved thereby, and the rotary electric machine can be reduced in size.

Because the first terminal wires 10h are led radially outward so as to pass along a plane on the second coil ends 6b that is perpendicular to the axial direction of the stator core 3, the welding position is identical in the axial direction in all of the end portions of the first terminal wires 10h, enabling the manufacturing steps to be simplified, thereby enabling reductions in cost to be achieved.

All of the first terminal wires 10h are formed by bending so as to have identical shapes, and all of the intraphase connecting second terminal wires in the second terminal wires 10i are formed by bending so as to have identical shapes. Thus, because the winding bodies 10 that are connected within a phase all have identical shapes, reducing the types of winding bodies 10, reductions in cost can be achieved.

Because the same-phase connecting second terminal wires among the second terminal wires 10i are connected directly to the same-phase connecting first terminal wires that are subject to connection therewith among the first terminal wires 10h, it is not necessary to connect the same-phase connecting first terminal wires and the same-phase connecting second terminal wires using a separate member from the conductor wires 9. Thus, the number of parts can be reduced, enabling reductions in cost to be achieved.

The alternating-current connecting second terminal wires and the electric power supplying terminal second terminal wires among the second terminal wires 10i are formed by bending so as to have identical shapes. Thus, because the winding bodies 10 that are alternating-current connected and the winding bodies 10 that have electric power supplying terminals all have identical shapes, reducing the types of winding bodies 10, reductions in cost can be achieved.

The end portions of the alternating-current connecting second terminal wires and the electric power supplying terminal second terminal wires are separated toward the stator core 3 from the end portions of the alternating-current connecting first terminal wires and the electric power supplying terminal first terminal wires among the first terminal wires 10h. Because the connecting member 20 that connects the end portions of the alternating-current connecting first terminal wires and the end portions of the alternating-current connecting second terminal wires is disposed in a space between the end portions of the alternating-current connecting and electric power supplying terminal second terminal wires and the end portions of the alternating-current connecting and electric power supplying terminal first terminal wires, space saving can be achieved, enabling the rotary electric machine to be reduced in size.

The connecting member 20 includes: a strip-shaped base 20a; and terminals 20b that each extend from the base 20a in a width direction and are then bent perpendicularly, three terminals 20b being disposed on each of two sides in the width direction of the base 20a so as to be separated in a longitudinal direction of the base 20a. The connecting member 20 is disposed in a space between the end portions of the alternating-current connecting and electric power supplying terminal second terminal wires and the end portions of the alternating-current connecting and electric power supplying terminal first terminal wires such that the base 20a is bent into a circular arc shape and the terminals 20b extend radially outward. In addition, the terminals 20b are disposed so as to be stacked and in contact in an axial direction with the end portions of the alternating-current connecting first terminal wires that are subject to connection therewith. The terminals 20b are also disposed so as to be stacked and in contact in an axial direction with the end portions of the alternating-current connecting second terminal wires that are subject to connection therewith. Thus, because the direction in which the end portions of the terminals 20b and the alternating-current connecting first terminal wires are welded is a radial direction, and the direction in which the end portions of the terminals 20b and the alternating-current connecting second terminal wires are welded is a radial direction, productivity can be improved.

Embodment 2

Figure 14:
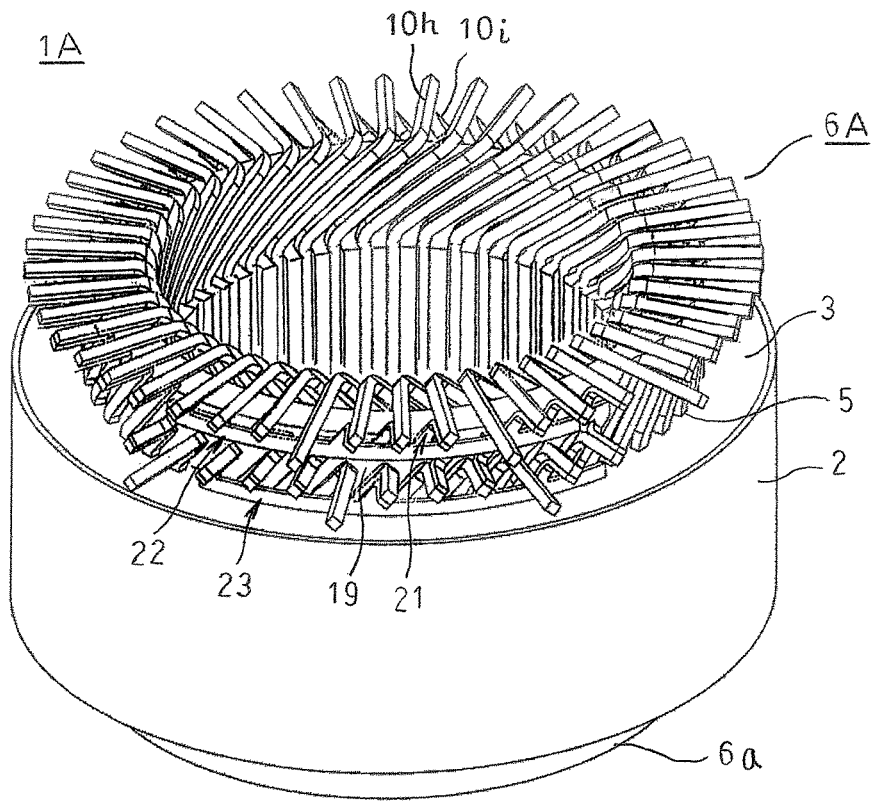
FIG. 14 is an oblique projection that shows a stator for a rotary electric machine according to Embodiment 2 of the present invention.
Figure 15:
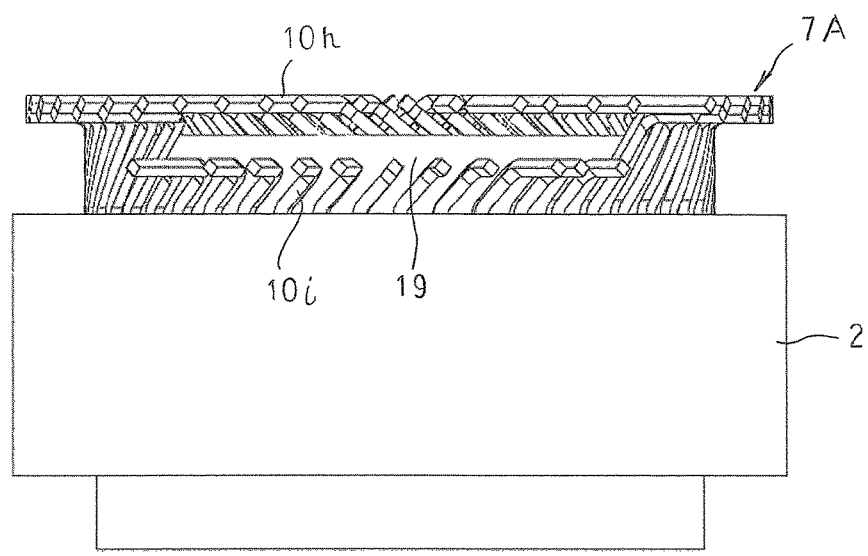
FIG. 15 is a side elevation that shows a state in which a winding assembly that constitutes part of the stator winding is mounted to the stator core in the stator for a rotary electric machine according to Embodiment 2.
Figure 16:
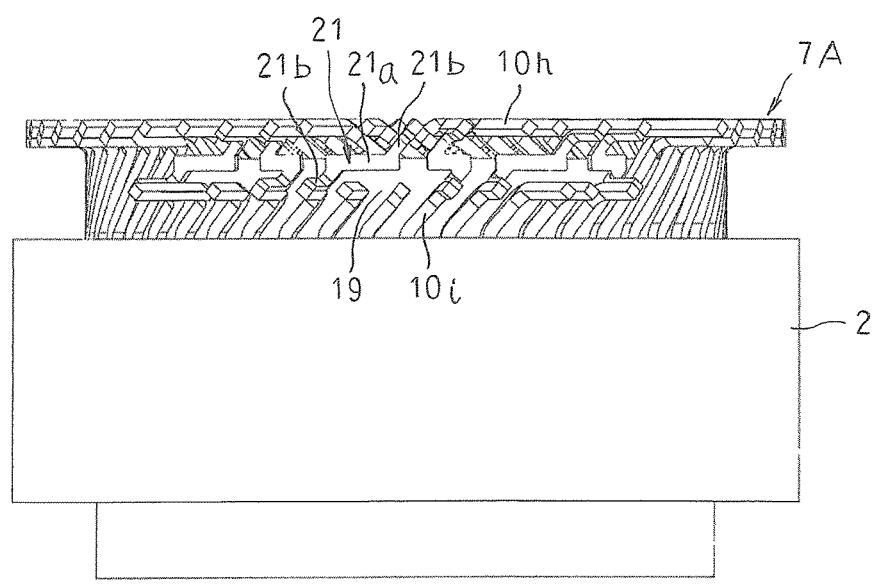
FIG. 16 is a side elevation that shows a state before alternating-current connection in the stator for a rotary electric machine according to Embodiment 2.
Figure 17:
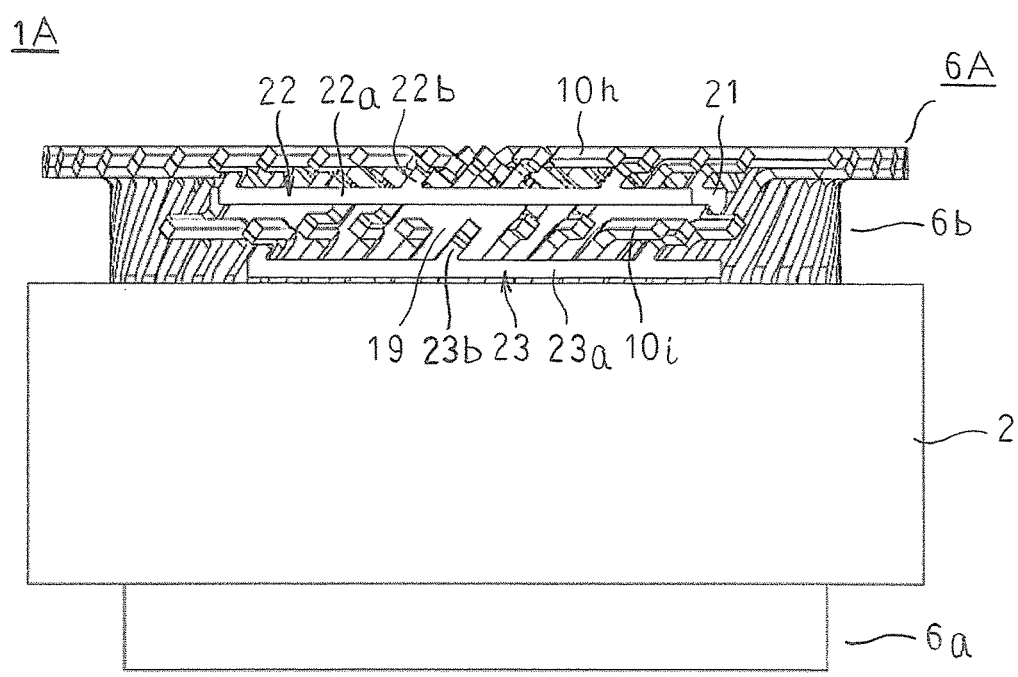
FIG. 17 is a side elevation that shows the stator for a rotary electric machine according to Embodiment 2 of the present invention.

FIG. 14 is an oblique projection that shows a stator for a rotary electric machine according to Embodment 2 of the present invention, FIG. 15 is a side elevation that shows a state in which a winding assembly that constitutes part of the stator winding is mounted to the stator core in the stator for a rotary electric machine according to Embodment 2, FIG. 16 is a side elevation that shows a state before alternating-current connection in the stator for a rotary electric machine according to Embodment 2, and FIG. 17 is a side elevation that shows the stator for a rotary electric machine according to Embodment 2 of the present invention.

In FIGS. 14 and 17, a stator 1A includes: an annular stator core 3; a stator winding 6A that is mounted to the stator core 3; and crossover conductors 21, a first connecting member 22A, and a second connecting member 22B that connect the stator winding 6A.

As shown in FIG. 15, a winding assembly 7A is configured by arranging forty-eight winding bodies 10 at a pitch of one slot concentrically. Same-phase connecting second terminal wires, alternating-current connecting second terminal wires, and electric power supplying terminal second terminal wires among second terminal wires 10i are formed by bending so as to have identical shapes, and exit slots 5 and extend at an angle of inclination θ in a second circumferential direction, are then bent to extend axially outward, and are bent to extend radially outward at positions that are separated toward the stator core 3 from end portions of first terminal wires 10h.

The crossover conductors 21 are produced by pressing and shaping a copper sheet, for example, and as shown in FIG. 16, each include: a strip-shaped base 21a; and a pair of terminals 21b that each extend from the base 20a from two longitudinal ends and are then bent perpendicularly. The crossover conductors 21 are disposed in a space between end portions of same-phase connecting first terminal wires and end portions of same-phase connecting second terminal wires that are separated axially. End portions of first terminals 21b that extend radially outward are disposed so as to be stacked approximately axially with and in contact with surfaces of end portions of the same-phase connecting first terminal wires that face toward the stator core 3. End portions of second terminals 21b that extend radially outward are disposed so as to be stacked approximately axially with and in contact with surfaces of end portions of the same-phase connecting second terminal wires that face away from the stator core 3. Then, the end portions of the same-phase connecting first terminal wires and the end portions of the first terminals 21b that are stacked approximately axially, and the end portions of the same-phase connecting second terminal wires and the end portions of the second terminals 21b that are stacked approximately axially, are connected by TIG-welding from radially outside.

A U1-phase winding, a V1-phase winding, a W1-phase winding, a U2-phase winding, a V2-phase winding, and a W2-phase winding are produced thereby.

The first connecting member 22 is produced by pressing and shaping a copper sheet, for example, and as shown in FIG. 17, includes: a strip-shaped base 22a; and three terminals 22b that each extend from the base 22a in a first width direction and are then bent perpendicularly, so as to be separated in a longitudinal direction of the base 22a. The second connecting member 23 is produced by pressing and shaping a copper sheet, for example, and as shown in FIG. 17, includes: a strip-shaped base 23a; and three terminals 23b that each extend from the base 23a in a first width direction and are then bent perpendicularly, so as to be separated in a longitudinal direction of the base 23a.

As shown in FIG. 17, the first connecting member 22 is disposed in a space between the end portions of the alternating-current connecting first terminal wires and the alternating-current connecting second terminal wires that are separated axially, such that the base 22a is bent into a circular arc shape, and the terminals 22b extend radially outward. End portions of the terminals 22b that extend radially outward are disposed so as to be stacked approximately axially with and in contact with surfaces of end portions of the alternating-current connecting first terminal wires that are subject to connection therewith that face toward the stator core 3. Then, the end portions of the alternating-current connecting first terminal wires and the end portions of the terminals 22b that are stacked approximately axially are connected by TIG-welding from radially outside.

In addition, the second connecting member 23 is disposed in a space between the end portions of the alternating-current connecting second terminal wires and the stator core 3 that are separated axially, such that the base 23a is bent into a circular arc shape, and the terminals 23b extend radially outward. End portions of the terminals 23b that extend radially outward are disposed so as to be stacked approximately axially with and in contact with surfaces of end portions of the alternating-current connecting second terminal wires that are subject to connection therewith that face toward the stator core 3. Then, the end portions of the alternating-current connecting second terminal wires and the end portions of the terminals 23b that are stacked approximately axially are connected by TIG-welding from radially outside.

A stator winding 6A that is constituted by a first three-phase alternating-current winding in which the U1-phase winding, the V1-phase winding, and the W1-phase winding are wye-connected and a second three-phase alternating-current winding in which the U2-phase winding, the V2-phase winding, and the W2-phase winding are wye-connected is produced thereby.

Consequently, similar or identical effects to those in Embodiment 1 above can also be achieved in Embodment 2.

According to Embodment 2, same-phase connecting second terminal wires, alternating-current connecting second terminal wires, and electric power supplying terminal second terminal wires among second terminal wires 10i are all formed by bending so as to have identical shapes. Thus, because the winding bodies 10 that are connected to the same phase, the winding bodies 10 that are alternating-current connected, and the winding bodies 10 that have electric power supplying terminals all have identical shapes, reducing the types of winding bodies 10, reductions in cost can be achieved.

Moreover, in each of the above embodiments, the winding bodies are produced using conductor wire that has a rectangular cross section, but the cross section of the conductor wire that constitutes the winding bodies is not limited to a rectangular shape, and conductor wire that has a circular cross section may be used, for example.

In each of the above embodiments, a first three-phase alternating-current winding is configured by wye-connecting the U1-phase winding, the V1-phase winding, and the W1-phase winding, and a second three-phase alternating-current winding is configured by wye-connecting the U2-phase winding, the V2-phase winding, and the W2-phase winding, but a first three-phase alternating-current winding may be configured by delta-connecting the U1-phase winding, the V1-phase winding, and the W1-phase winding, and a second three-phase alternating-current winding configured by delta-connecting the U2-phase winding, the V2-phase winding, and the W2-phase winding. In that case, first and second terminal wires that constitute two ends of the U1-phase winding, the V1-phase winding, the W1-phase winding, the U2-phase winding, the V2-phase winding, and the W2-phase winding are delta connecting terminals and electric power supplying terminals, and connecting portions among the delta connecting terminals constitute an alternating-current connecting portion.

In each of the above embodiments, a U1-phase winding, a V1-phase winding, a W1-phase winding, a U2-phase winding, a V2-phase winding, and a W2-phase winding are each configured by connecting small coil groups in series, but a U1-phase winding, a V1-phase winding, a W1-phase winding, a U2-phase winding, a V2-phase winding, and a W2-phase winding may each be configured by connecting small coil groups in parallel.

In each of the above embodiments, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. In each of the above embodiments, the number of slots per phase per pole was two, and the spacing between the slots into which the rectilinear portions of the winding bodies are inserted was an angular pitch of six slots (a pitch of one magnetic pole), but if the number of slots per phase per pole is one, spacing between the slots into which the rectilinear portions of the winding bodies are inserted is an angular pitch of three slots (a pitch of one magnetic pole). Furthermore, if the number of slots per phase per pole is one, there are intraphase connecting portions and alternating-current connecting portions, but no same-phase connecting portions.

In each of the above embodiments, the winding bodies are constituted by full-pitch windings, but the winding bodies may be constituted by short-pitch windings or long-pitch windings.

In each of the above embodiments, winding bodies have been used in which two δ-shaped coil patterns that are arranged radially are formed continuously, but winding bodies may be formed using one δ-shaped coil pattern, or may be formed using three or more δ-shaped coil patterns that are arranged radially.

In each of the above embodiments, winding bodies have been used in which two δ-shaped coil patterns that are arranged radially are formed continuously, but the winding bodies are not limited to winding bodies in which two δ-shaped coil patterns that are arranged radially are formed continuously, provided that distributed winding bodies are disposed at a pitch of one slot so as to be equal in number to the number of slots in the stator core, and the first terminal wires of each of the winding bodies protrude axially outward from radially inside second coil ends, and the second terminal wires protrude axially outward from radially outside the second coil ends. For example, winding bodies may be used that are formed into a "hexagonal" coil pattern in which a conductor wire is wound helically for a plurality of turns.

What is claimed is:

1. A stator for a rotary electric machine, said stator comprising:
   an annular stator core in which slots are arranged circumferentially; and
   a stator winding that is mounted to said stator core,
   wherein:
   said stator winding is configured by mounting distributed winding bodies to said stator core circumferentially at a pitch of one slot so as to be equal in number to a total number of said slots, said distributed winding bodies each being constituted by a jointless continuous conductor wire that is coated with insulation;
   said winding bodies comprise:
   a first terminal wire of said conductor wire that extends outward at a first axial end of said stator core from a radially innermost position inside said slots; and
   a second terminal wire of said conductor wire that extends outward at said first axial end of said stator core from a radially outermost position inside said slots;
   said first terminal wires are each led radially outward around an entire circumference of the stator core over coil ends of said stator winding;
   said second terminal wires are each led radially outward around the entire circumference of the stator core at positions that are nearer to said stator core than end portions of said first terminal wires that are led radially outward over said coil ends of said stator winding; and end portions of intraphase connecting second terminal wires that constitute intraphase connecting portions among said second terminal wires are stacked in an axial direction with, placed in contact with, and connected to end portions of intraphase connecting first terminal wires that constitute intraphase connecting portions that are subject to connection therewith among said first terminal wires.

2. The stator for a rotary electric machine according to claim 1, wherein:

all of said first terminal wires are configured so as to have identical shapes, and are led radially outward on a common plane that is perpendicular to an axial direction; and all of said intraphase connecting second terminal wires are configured so as to have identical shapes.

3. The stator for a rotary electric machine according to claim 2, wherein:

slots per phase per pole are m in number, where m is a natural number that is greater than or equal to 2; and end portions of same-phase connecting second terminal wires that constitute same-phase connecting portions among said second terminal wires are stacked in an axial direction with, placed in contact with, and joined to end portions of same-phase connecting first terminal wires that constitute same-phase connecting portions that are subject to connection therewith among said first terminal wires.

4. The stator for a rotary electric machine according to claim 3, wherein:

alternating-current connecting second terminal wires that constitute alternating-current connecting portions and electric power supplying terminal second terminal wires that constitute electric power supplying terminals among said second terminal wire are all configured so as to have identical shapes, and are led radially outward at positions that are separated toward said stator core from end portions of said first terminal wires that are led radially outward over coil ends of said stator winding; and end portions of said alternating-current connecting second terminal wires and end portions of alternating-current connecting first terminal wires that constitute alternating-current connecting portions among said first terminal wires are connected using a connecting member that is a separate member from said conductor wire.

5. The stator for a rotary electric machine according to claim 4, wherein said connecting member is a single member, and is disposed axially between end portions of said alternating-current connecting second terminal wires and end portions of said alternating-current connecting first terminal wires that are connected.

6. The stator for a rotary electric machine according to claim 4, wherein said connecting member comprises:

a first connecting member that is disposed axially between end portions of said alternating-current connecting second terminal wires and end portions of said alternating-current connecting first terminal wires, and that connects end portions of said alternating-current connecting first terminal wires; and a second connecting member that is disposed between end portions of said alternating-current connecting second terminal wires and said stator core, and that connects end portions of said alternating-current connecting second terminal wires.

7. The stator for a rotary electric machine according to claim 2, wherein:

slots per phase per pole are m in number, where m is a natural number that is greater than or equal to 2;

same-phase connecting second terminal wires that constitute same-phase connecting portions among said second terminal wires are all configured so as to have identical shapes, and are led radially outward at positions that are separated toward said stator core from end portions of said first terminal wires that are led radially outward over coil ends of said stator winding;

end portions of said same-phase connecting second terminal wires are each connected to end portions of same-phase connecting first terminal wires that constitute same-phase connecting portions that are subject to connection therewith among said first terminal wires using a crossover conductor that is a separate member from said conductor wire; and said crossover conductor is disposed axially between end portions of said same-phase connecting second terminal wires and end portions of said same-phase connecting first terminal wires that are connected.

8. The stator for a rotary electric machine according to claim 7, wherein:

alternating-current connecting second terminal wires that constitute alternating-current connecting portions and electric power supplying terminal second terminal wires that constitute electric power supplying terminals among said second terminal wire are all configured so as to have identical shapes to said same-phase connecting second terminal wires; and end portions of said alternating-current connecting second terminal wires and end portions of alternating-current connecting first terminal wires that constitute alternating-current connecting portions that are subject to connection therewith among said first terminal wires are connected using a connecting member that is a separate member from said conductor wire.

9. The stator for a rotary electric machine according to claim 8, wherein said connecting member is a single member, and is disposed axially between end portions of said alternating-current connecting second terminal wires and end portions of said alternating-current connecting first terminal wires that are connected.

10. The stator for a rotary electric machine according to claim 8, wherein said connecting member comprises:

a first connecting member that is disposed axially between end portions of said alternating-current connecting second terminal wires and end portions of said alternating-current connecting first terminal wires, and that connects end portions of said alternating-current connecting first terminal wires; and a second connecting member that is disposed between end portions of said alternating-current connecting second terminal wires and said stator core, and that connects end portions of said alternating-current connecting second terminal wires.

11. The stator for a rotary electric machine according to claim 1, wherein:

slots per phase per pole are m in number, where m is a natural number that is greater than or equal to 2; and end portions of same-phase connecting second terminal wires that constitute same-phase connecting portions among said second terminal wires are stacked in an axial direction with, placed in contact with, and joined to end portions of same-phase connecting first terminal wires that constitute same-phase connecting portions that are subject to connection therewith among said first terminal wires.

12. The stator for a rotary electric machine according to claim 11, wherein:
   alternating-current connecting second terminal wires that constitute alternating-current connecting portions and electric power supplying terminal second terminal wires that constitute electric power supplying terminals among said second terminal wire are all configured so as to have identical shapes, and are led radially outward at positions that are separated toward said stator core from end portions of said first terminal wires that are led radially outward over coil ends of said stator winding; and
   end portions of said alternating-current connecting second terminal wires and end portions of alternating-current connecting first terminal wires that constitute alternating-current connecting portions among said first terminal wires are connected using a connecting member that is a separate member from said conductor wire.

13. The stator for a rotary electric machine according to claim 12, wherein said connecting member is a single member, and is disposed axially between end portions of said alternating-current connecting second terminal wires and end portions of said alternating-current connecting first terminal wires that are connected.

14. The stator for a rotary electric machine according to claim 12, wherein said connecting member comprises:
   a first connecting member that is disposed axially between end portions of said alternating-current connecting second terminal wires and end portions of said alternating-current connecting first terminal wires, and that connects end portions of said alternating-current connecting first terminal wires; and
   a second connecting member that is disposed between end portions of said alternating-current connecting second terminal wires and said stator core, and that connects end portions of said alternating-current connecting second terminal wires.

15. The stator for a rotary electric machine according to claim 1, wherein:
   slots per phase per pole are m in number, where m is a natural number that is greater than or equal to 2;
   same-phase connecting second terminal wires that constitute same-phase connecting portions among said second terminal wires are all configured so as to have identical shapes, and are led radially outward at positions that are separated toward said stator core from end portions of said first terminal wires that are led radially outward over coil ends of said stator winding;
   end portions of said same-phase connecting second terminal wires are each connected to end portions of same-phase connecting first terminal wires that constitute same-phase connecting portions that are subject to connection therewith among said first terminal wires using a crossover conductor that is a separate member from said conductor wire; and
   said crossover conductor is disposed axially between end portions of said same-phase connecting second terminal wires and end portions of said same-phase connecting first terminal wires that are connected.

16. The stator for a rotary electric machine according to claim 15, wherein:
   alternating-current connecting second terminal wires that constitute alternating-current connecting portions and electric power supplying terminal second terminal wires that constitute electric power supplying terminals among said second terminal wire are all configured so as to have identical shapes to said same-phase connecting second terminal wires; and
   end portions of said alternating-current connecting second terminal wires and end portions of alternating-current connecting first terminal wires that constitute alternating-current connecting portions that are subject to connection therewith among said first terminal wires are connected using a connecting member that is a separate member from said conductor wire.

17. The stator for a rotary electric machine according to claim 16, wherein said connecting member is a single member, and is disposed axially between end portions of said alternating-current connecting second terminal wires and end portions of said alternating-current connecting first terminal wires that are connected.

18. The stator for a rotary electric machine according to claim 16, wherein said connecting member comprises:
   a first connecting member that is disposed axially between end portions of said alternating-current connecting second terminal wires and end portions of said alternating-current connecting first terminal wires, and that connects end portions of said alternating-current connecting first terminal wires; and
   second connecting member that is disposed between end portions of said alternating-current connecting second terminal wires and said stator core, and that connects end portions of said alternating-current connecting second terminal wires.

* * * * *